United States Patent
Schaller

(10) Patent No.: US 7,971,731 B2
(45) Date of Patent: *Jul. 5, 2011

(54) DENSITY BAFFLE FOR CLARIFIER TANK

(76) Inventor: Earle Schaller, Palm Beach Gardens, FL (US)

(*) Notice: Subject to any disclaimer, the term of this patent is extended or adjusted under 35 U.S.C. 154(b) by 105 days.

This patent is subject to a terminal disclaimer.

(21) Appl. No.: 12/512,489

(22) Filed: Jul. 30, 2009

(65) Prior Publication Data

US 2010/0089821 A1    Apr. 15, 2010

Related U.S. Application Data

(63) Continuation-in-part of application No. 12/423,181, filed on Apr. 14, 2009.

(60) Provisional application No. 61/206,039, filed on Jan. 26, 2009, provisional application No. 61/206,574, filed on Jan. 30, 2009, provisional application No. 61/196,405, filed on Oct. 15, 2008.

(51) Int. Cl.
*B01D 21/02* (2006.01)

(52) U.S. Cl. ........... 210/521; 210/528; 210/532.1; 210/539; 210/541; 220/660

(58) Field of Classification Search ........... 210/521, 210/525, 528, 532.1, 539, 541; 220/654, 220/660

See application file for complete search history.

(56) References Cited

U.S. PATENT DOCUMENTS

| 707,567 | A | 8/1902 | Edson |
|---|---|---|---|
| 1,815,159 | A | 7/1931 | Nordell |
| RE20,761 | E | 6/1938 | Pruss |
| 2,150,157 | A | 3/1939 | Franklin |
| 2,343,836 | A | 3/1944 | Weber |
| 2,422,394 | A | 6/1947 | Carter |
| 2,679,477 | A | 9/1947 | Kivari |
| 2,509,933 | A | 5/1950 | Lind |
| 2,790,372 | A | 4/1957 | Cooper |
| 2,826,306 | A | 3/1958 | Burns |
| 3,184,065 | A | 5/1965 | Bradford |
| 3,353,676 | A | 11/1967 | Adler |
| 3,385,786 | A | 5/1968 | Klock |
| 3,489,287 | A | 1/1970 | Streander |
| 3,497,892 | A | 1/1970 | McCann |
| 3,849,311 | A | 11/1974 | Jakubek |
| 4,011,164 | A | 3/1977 | McGivern |
| 4,053,421 | A | 10/1977 | Pentz |
| 4,109,433 | A | 8/1978 | Maze |
| 4,202,778 | A | 5/1980 | Middelbeek |
| 4,346,005 | A | 8/1982 | Zimmerman |

(Continued)

FOREIGN PATENT DOCUMENTS

EP    9594059    11/1995

(Continued)

*Primary Examiner* — Christopher Upton

(74) *Attorney, Agent, or Firm* — Sofer & Haroun, LLP

(57) ABSTRACT

A baffle system in a clarifier tank having a tank bottom, a periphery, a substantially vertical peripheral wall bounding the interior of the tank and an effluent channel includes a plurality of baffles mounted on the clarifier tank. Each baffle has a baffle surface with a lower end and an upper end. The upper end is coupled to a wall of the clarifier tank and the lower end is disposed at a substantially 60° angle away from the side wall of the clarifier tank such that the baffle surface slopes downwardly and away from the side wall.

20 Claims, 13 Drawing Sheets

END VIEW
INBOARD LAUNDER BAFFLE CONFIGURATION

U.S. PATENT DOCUMENTS

| | | | |
|---|---|---|---|
| 4,380,748 A | 4/1983 | Hill |
| 4,390,422 A | 6/1983 | Mackrle |
| 4,391,704 A | 7/1983 | Anderson |
| 4,531,455 A | 7/1985 | Palmer |
| 4,584,802 A | 4/1986 | Casselman |
| 4,613,434 A | 9/1986 | Maata |
| 4,664,794 A | 5/1987 | Mackrle |
| 4,706,418 A | 11/1987 | Stewart |
| 4,710,292 A | 12/1987 | DeVos |
| 4,747,196 A | 5/1988 | Moir |
| 4,758,339 A | 7/1988 | Vellinga |
| 4,767,536 A | 8/1988 | Roley |
| 4,780,206 A | 10/1988 | Beard |
| 4,816,157 A | 3/1989 | Jennelle |
| 4,830,748 A | 5/1989 | Hall |
| 4,847,926 A | 7/1989 | Laputka |
| 4,876,010 A | 10/1989 | Riddle |
| 4,899,505 A | 2/1990 | Williamson |
| 5,049,278 A | 9/1991 | Galper |
| 5,139,657 A | 8/1992 | Nojima |
| 5,176,823 A | 1/1993 | Roley |
| 5,227,077 A | 7/1993 | Shea |
| 5,252,205 A | 10/1993 | Schaller |
| 5,286,392 A | 2/1994 | Shea |
| 5,344,563 A | 9/1994 | Noyes |
| 5,597,483 A | 1/1997 | Schaller |
| 5,670,045 A | 9/1997 | Schaller |
| 5,688,400 A | 11/1997 | Baxter |
| 5,965,023 A | 10/1999 | Schaller |
| 6,113,800 A | 9/2000 | Hopkins |
| 6,216,881 B1 | 4/2001 | Schaller |
| 6,712,222 B2 | 3/2004 | Schaller |
| 7,416,662 B2 | 8/2008 | Aditham et al. |
| 7,556,157 B2 * | 7/2009 | Schaller et al. ............... 210/521 |
| 7,722,776 B2 * | 5/2010 | Essemiani et al. ............ 210/521 |
| 7,726,494 B2 * | 6/2010 | Schaller et al. ............... 210/521 |
| 2008/0230463 A1 | 9/2008 | Schaller |
| 2010/0193423 A1 * | 8/2010 | Schaller et al. ............... 210/232 |
| 2010/0213120 A1 * | 8/2010 | Schaller et al. ............... 210/521 |

FOREIGN PATENT DOCUMENTS

| | | |
|---|---|---|
| JP | 3408542 | 3/2003 |
| WO | PCT/US9600535 | 5/1996 |
| WO | PCT/US2007021901 | 3/2008 |
| WO | PCT/US2007024433 | 7/2008 |

* cited by examiner

CASE 01

CASE 07 (60 DEGREE ANGLE)

PERSPECTIVE VIEW
INBOARD LAUNDER BAFFLE CONFIGURATION

END VIEW
INBOARD LAUNDER BAFFLE CONFIGURATION

DENSITY BAFFLE FOR CLARIFIER TANK

RELATED APPLICATIONS

This application is a C-I-P of U.S. patent application Ser. No. 12/423,181, filed on Apr. 14, 2009 which claims the benefit of U.S. Provisional Patent Application No. 61/206,039, filed on Jan. 26, 2009; and U.S. Provisional Patent Application No. 61/206,574, filed on Jan. 30, 2009 the entirely of which are incorporated by reference. This application also claims the benefit of priority from U.S. Provisional Patent Application No. 61/196,405, filed on Oct. 15, 2008, the entirety of which is incorporated by reference.

BACKGROUND

1. Field of the Invention

This application relates to a baffle and baffle system for use in a solids-precipitating clarifier tank. More particularly, the application relates to a baffle and baffle system having a plurality of inter-engaged individual baffles secured to the clarifier tank peripheral wall.

2. Prior Art Discussion

Passive baffle devices, also known in the art as a lamella gravity separators or settlers, are used in clarifier tanks for waste treatment for gravitationally separating suspended solids from solids containing carrier liquid of fluid suspensions. The clarifier tanks, with which such baffles are typically used, are circular or rectangularly configured tanks in which a centrally mounted radially extending arm is slowly moved or rotated about the tank at or proximate the surface of the carrier liquid.

Specifically, in waste water treatment facilities utilizing secondary clarifiers, the clarifier's effectiveness in removing solids is perhaps the most important factor in establishing the final effluent quality of the facility. A major deterrent to effective removal is the presence of sludge density currents which cause hydraulic short circuits within the tank. These short circuits, in turn, allow solids concentrations to unintentionally bypass the tank's clarification volume and enter the effluent.

In the prior art, peripheral baffles are attached to the tank wall and directed downward at an angle into the tank. These baffles help to interrupt the density currents and properly redirect the flow of solids away from the effluent and into the main clarification volume (center) of the tank.

However, although these density baffle systems work to significantly reduce solids from entering the effluent, under greater load conditions these baffle systems occasionally fail, allowing for the above described short circuits.

SUMMARY

The present arrangement overcomes the drawbacks associated with the prior art providing for a density current baffle and installation employing the same, with an inclined surface, having a modified angle of attachment, dimensioned to minimize the density currents and properly redirect the flow of solids away from the effluent and into the main clarification volume (center) of the tank.

To this end, a baffle system is used in a clarifier tank having a tank bottom and a periphery and a substantially vertical peripheral wall bounding the interior of the tank. The baffle system has a plurality of the baffles mounted on the peripheral wall of the clarifier tank. Each baffle has a baffle surface with a lower end and an upper end. The upper end of the baffle surface is coupled to the side wall of the clarifier tank wall. The lower end of the baffle surface portion is disposed, at a substantially 60° angle away from the side wall of the clarifier tank such that the baffle surface slopes downwardly and away from the side wall.

BRIEF DESCRIPTION OF THE DRAWINGS

The present invention can be best understood through the following description and accompanying drawings, wherein.

DETAILED DESCRIPTION

Figure 1:
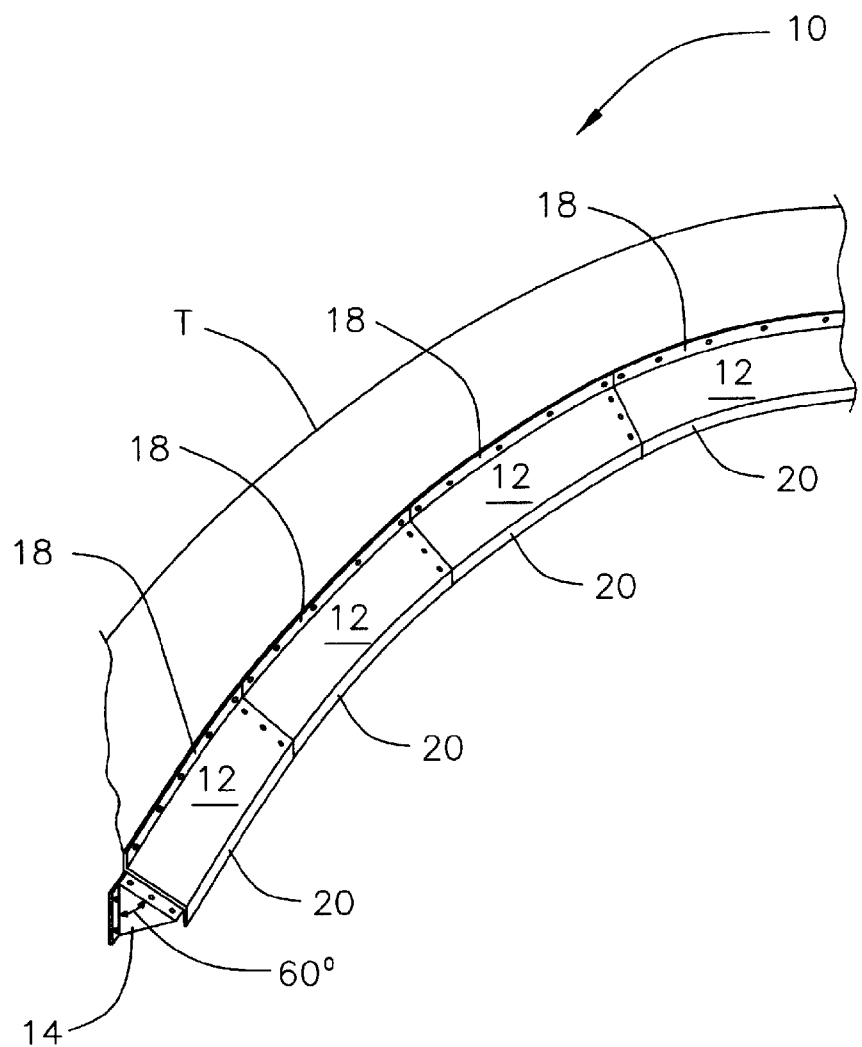
FIG. 1 shows a clarifier tank and density baffle in accordance with one embodiment.

In one arrangement, as shown in FIG. 1, a density current baffle 10 is shown attached to a tank wall T. Density baffle 10 is made from a plurality of connected baffle surfaces 12, each of which forming a portion of baffle 10 about the circumference of tank wall T.

Bracket elements 14 are positioned under baffle surfaces 12, preferably at the connection points between adjacent baffle surfaces as shown in FIG. 1. In one arrangement, and upper mounting flange 18 is located at the top edge of each of baffle surfaces 12 for coupling baffle surfaces 12 to tank wall T. Also as shown n FIG. 1, an end flange 20 projects downward from each of baffle surfaces 12, substantially perpendicular to tank wall T. Bracket element 14 and baffle surfaces 12 can be molded as an one piece fiberglass baffle.

Figure 2:
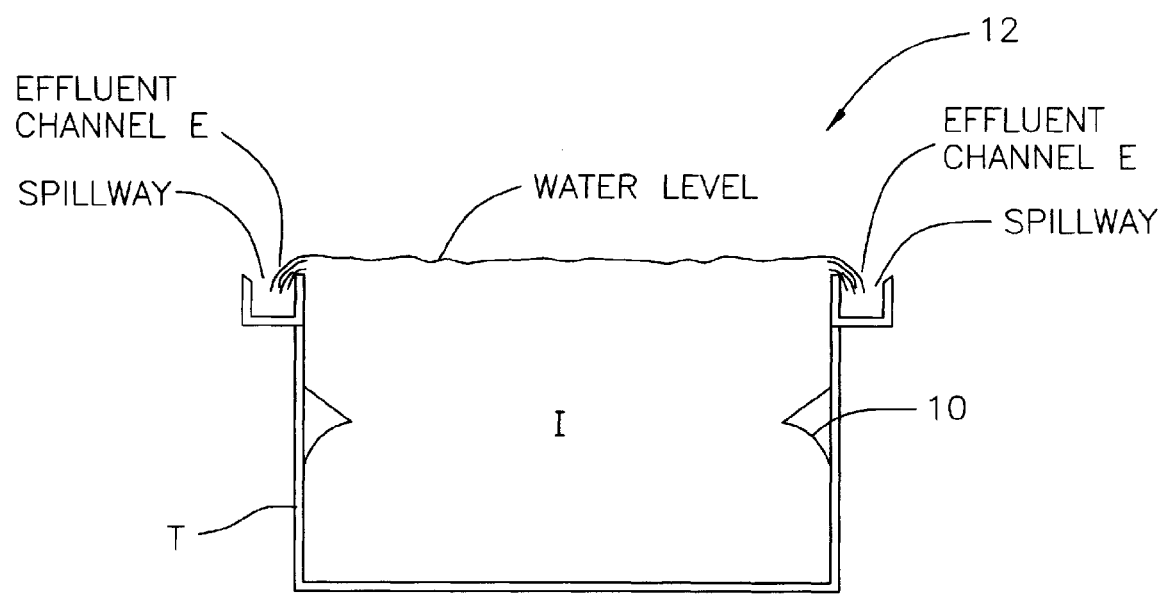
FIG. 2 shows the density baffle within a clarifier tank in cross section view, in accordance with one embodiment.

FIG. 2 shows a cut away view of baffle 10 within a typically circular type clarifier tank C, having an influent I, tank wall T, a spillway effluent channel and a weir W. Sludge blanket S is shown at the bottom of clarifier tank C, referring to the settled solids.

Figure 3:
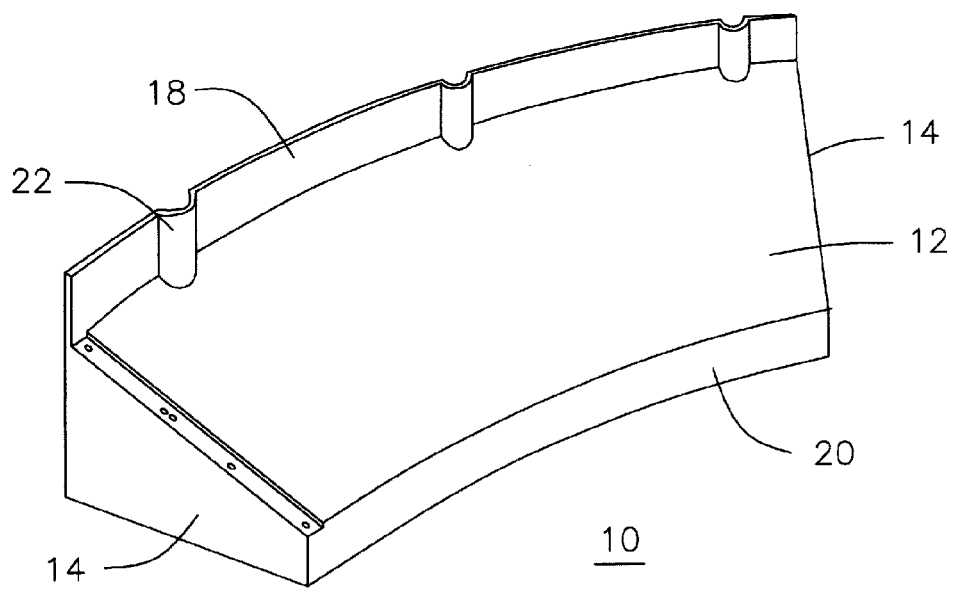
FIG. 3 shows a close up view of a density baffle surface from FIG. 1 in accordance with one embodiment.

In one embodiment, as shown in FIG. 3, a close up view is shown of a single baffle surface 12 of baffle 10. As shown in FIG. 2, baffle surface 12 may optionally have one or more vent openings 22 located at the top surface. In one arrangement, vents 22 are formed as convex deformations of upper mounting flange 18. As noted above, baffle 10 is configured to prevent solids carried by density currents from flowing upwards and out of the clarifier tank. However, because of the downward sloping design of baffle surfaces 12, some solids may become trapped and produce a buildup of gases damaging baffle surfaces 12 and possibly reducing their functionality. Vents 22 allow these gases to escape to the surface without harming baffle 10.

Using the basic design as set forth above for baffle 10 and baffle surfaces 12, it has been found by the inventor that by implementing certain advantageous arrangements of baffle surfaces 12, including the deflection angle of baffle surfaces 12 from tank wall T, the length of projection of the bottom of baffle surfaces 12 from Tank wall T into the center of tank C and the position of baffle surfaces 12 at certain heights on tank wall T, the relative concentration of solids in the effluent may be substantially reduces over the prior art designs. The following description sets forth the salient features of the baffle 10/baffle surfaces 12 in those respects.

Figure 4:
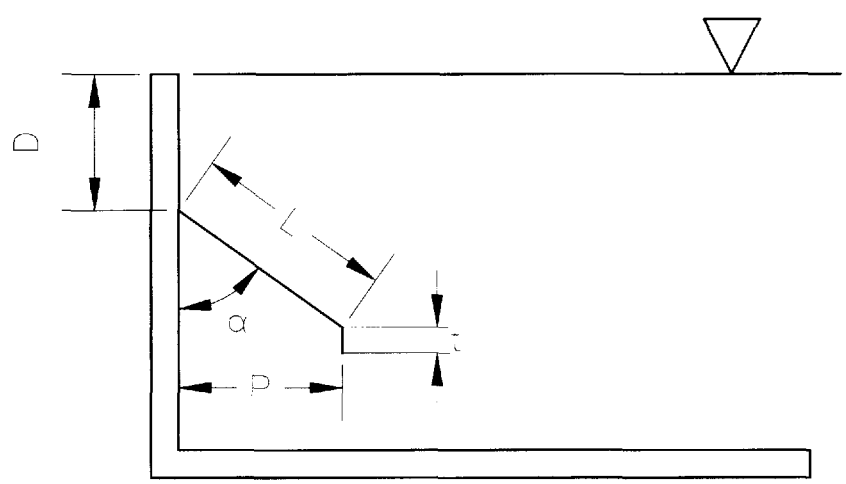
FIG. 4 shows a schematic diagram of the baffle of FIG. 1, in accordance with one embodiment.

As shown in FIG. 4, the schematic drawing identifies the measurements that define the size and positioning of baffle surfaces 12.

D=distance from weir (water level)
L=Length of baffle surface 12
α=angle from wall T
t=size end flange
P=Projection distance from wall T (based on α and L)

It is noted that the desired minimum horizontal projection is ideally based on the following equation(s)
In metric units:

Minimum Horizontal Projection=440mm+α(d−9.15) m,

Where Horizontal Projection is in millimeters
α=16.7 millimeters per meter, and
d=tank diameter in meters
Or in English Units Minimum Horizontal Projection=18+α(d−30), Where Horizontal Projection is in inches
α=0.2 inches per foot, and
d=tank diameter in feet In some calculations—it is recommended to increase the minimum horizontal projection by increasing the value of α to 0.3 inches/foot (25 mm/m).

In view of the above, an exemplary series or modeling tests were performed to simulate sample baffle (of similar basic design to baffle 10 but with varying dimensions) performance in an exemplary 70-foot diameter clarifier C with 10-foot side water depth (height from bottom of tank to weir/water level). The dimensions of the exemplary clarifier C are give in the following Table 1.

TABLE 1

Circular Clarifier Dimensions

| Tank Diameter | 70 ft |
| Side Water Depth | 10 ft |
| Bottom Slope | 1:12 |
| RAS Well Diameter | 6 ft |
| Inlet Pipe Diameter | 2 ft |
| Influent Baffle Diameter | 23 ft |
| Influent Baffle Height | Variable |
| Effluent Launder Type | Outboard |

Simulations data was conducted using no baffle, a prior art baffle and several alternative designs. The simulations are carried out for a period of 110 to 220 minutes (real-time). During this period of time, effluent solids concentrations and the calculated velocity field were continuously recorded.

In the present instance, seven different baffle configurations were defined. Referring to FIG. 4 and Table 2 below, seven baffle configurations are set forth. Not identified in Table 2 is an eighth configuration, referred to as Case 0 which is a "no-baffle" or baseline configuration.

Case 1 is a prior art design for a baffle for this size clarifier, namely a baffle with 45 degree inclination angle and a 26 inch horizontal projection (18"+0.2(70°−30°)=26".

TABLE 2

Density Current Baffle Design Variations
(Length dimensions are inches, angle measures are degrees)

| Case Number | D | L | a | P | t |
|---|---|---|---|---|---|
| 1 | 36.0 | 37.0 | 45 | 26 | 3.0 |
| 2 | 36.0 | 52.4 | 30 | 26 | 3.0 |
| 3 | 12.0 | 37.0 | 45 | 26 | 3.0 |
| 4 | 36.0 | 48.0 | 45 | 34 | 3.0 |
| 5 | 36.0 | 24.0 | 45 | 17 | 3.0 |
| 6 | 60.0 | 37.0 | 45 | 26 | 3.0 |
| 7 | 36.0 | 30.3 | 60 | 26 | 3.0 |

In case 2, the inclination angle relative to wall T is a steep 30°, meaning it projects sharply downward. To maintain the projection distance P, the length L of the baffle surface was increased to 52.4 inches.

In case 3, the standard prior art baffle of case 1 is positioned 1 foot below the weir/water level instead of the typical 3 feet below as in case 1.

In case 4, the angle from tank wall T is kept at 45 degrees, but the baffle's horizontal projection into the tank is increased by 8."

In case 5, the angle from tank wall T is kept at 45 degrees, but the baffle's horizontal projection is decreased by 8."

In case 6, the prior art baffle of case 1 is positioned five feet below the weir instead of the normal three feet (of case 1).

In case 7, the inclination angle relative to wall T is a lowered to 60°, meaning it projects only slowly downward. To maintain the projection distance P (26"), the length L of the baffle surface was decreased to 30.3 inches.

Using the above seven (plus blank—case 0) dimensions for the baffles, the simulations were run assuming a three foot (0.914 m) deep blanket (settled solids on the bottom of clarifier C) and a Surface Overflow Rate (SOR) of 1300 gpd/sq ft (gallons per day per square foot of water surface area). This high SOR value was selected to examine the effectiveness of the baffles under what is generally considered a high flow rate or stress condition. While this is higher than typical clarifiers operate in general, it insures that active density currents are created and that the baffle designs are fully operating.

Computed effluent solids concentrations in the below test results are output for each Case scenario and normalized with respect to the maximum carry-over concentration, calculated for the baseline (Case 0—No baffle) computation. The rest results are done on a "better than-worse than" basis, with the results being within the range of prior recorded "real world" values and were consistent with one another and with the operating conditions.

Figure 5:
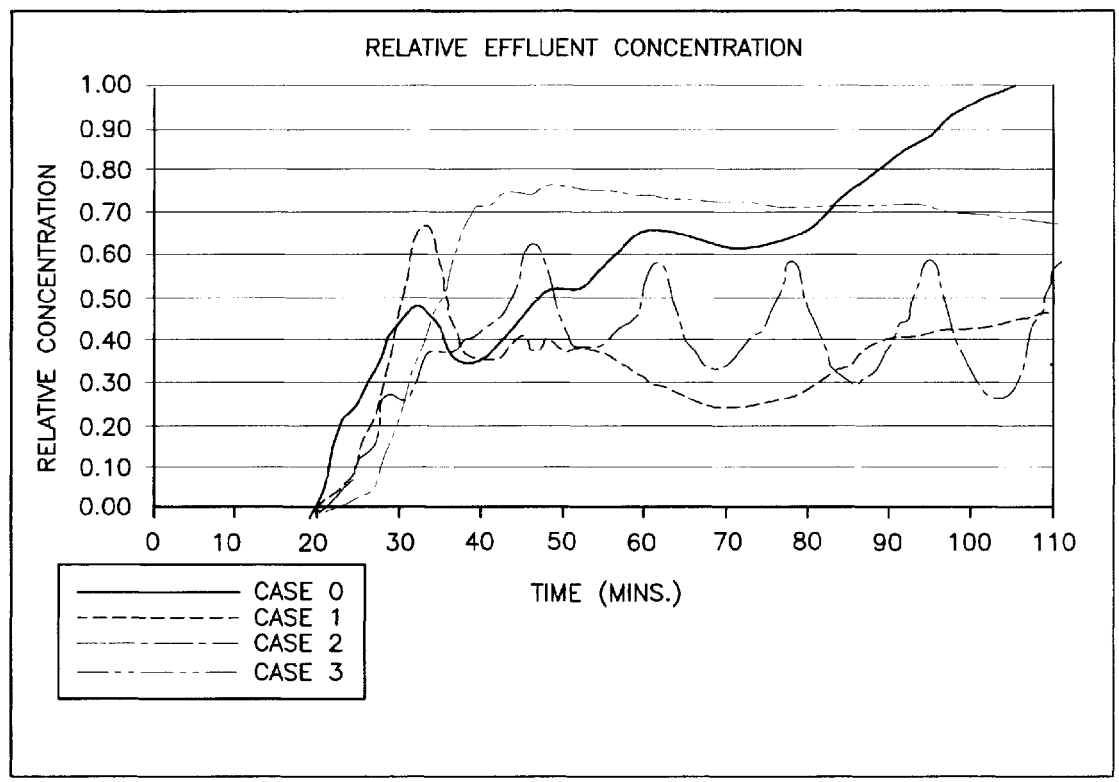
FIG. 5 shows a first set of exemplary test results.
Figure 6:
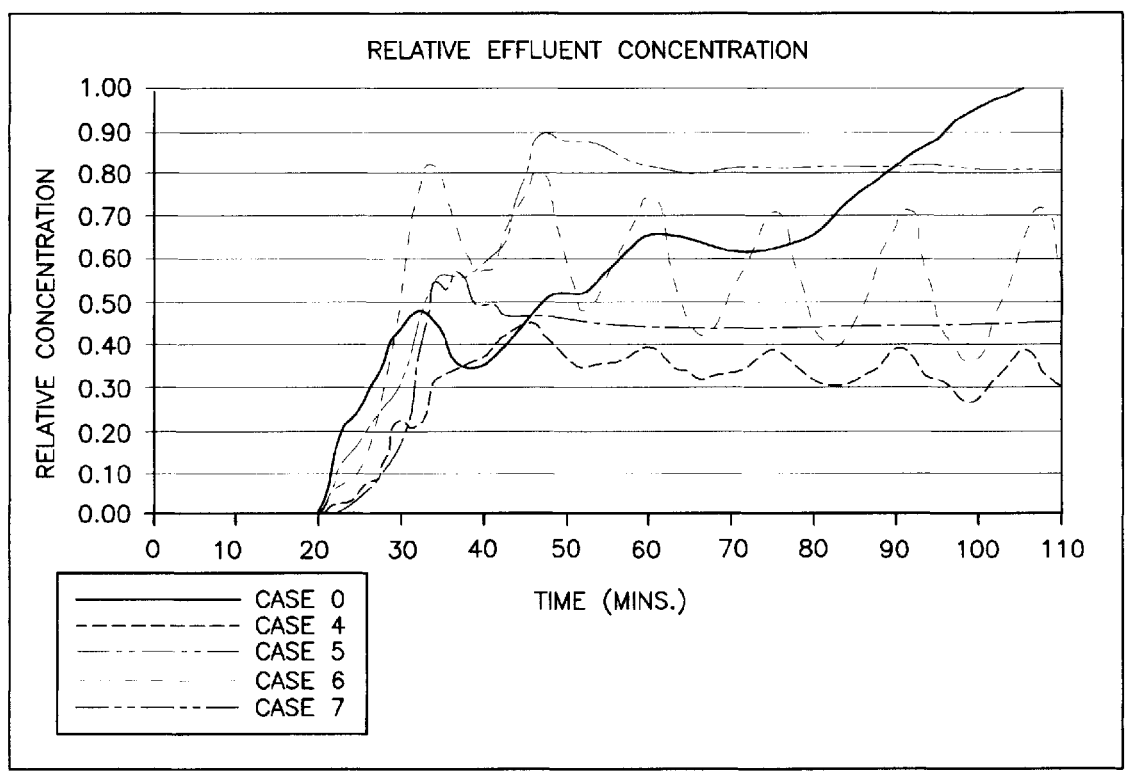
FIG. 6 shows a second set of exemplary test results.

FIG. 5 shows a comparison of Cases 0-3 with relative effluent solid concentration being measured over 110 minutes of operating time. FIG. 6 shows a similar comparison of cases 0 and 4-7.

The results of Case 0 show that no battle quickly results in a very high relative effluent concentration. The prior art baffle arrangement of Case 1 appears to do an effective job of reducing effluent solids under these operating condition.

Case 2, where the inclination angle relative to wall T is a steep 30°, appears to have some effectiveness, but the widely oscillating results show that steep angle likely creates an unsteady flow of solids preventing the generating of constant reduces flow.

In Case 5, the angle from tank wall T is kept at 45 degrees, but the baffle's horizontal projection is decreased by 8". As seen from FIG. 6, this was only marginally effective at reducing solids in the effluent, but did not even achieve the same results as the prior art Case 1.

The Case 3 and Case 6 baffles were located one foot and five feet below the weir, respectively. As noted above, in the simulation, the clarifier C had a 10-foot side water depth and the sludge blanket was assumed to be three feet deep from the bottom of clarifier C. Judging from the performance of the Case 3 baffle, it may be concluded that it was promised too far from the blanket, while the wave-like variations in the presentation of the Case 6 baffle results would appear to indicate that it was positioned too close to the blanket. The findings of Cases 3 and 6 confirm that baffles appears to be most effective when positioned midway between the blanket and the launder channel so as to allow sufficient clearance for solids to be deflected without impacting the blanket or being drawn into the weir current.

Finally, it is noted that Case 4 baffle (45 degrees with extended projection), and the Case 7 baffle (60 degrees with basic 26" projection), were both effective at reducing the total suspended solids in the effluent, at least as well, if not better than the prior art Case 1.

In view of the above, another exemplary series or modeling tests were performed for Cases 1, 4 and 7 to simulate baffle performance in an exemplary 100-foot diameter clarifier C with 14-foot side water depth (height from bottom of tank to weir/water level). Boundary conditions in the simulation were also maintained, including the influent solids concentration and the return flow compared to total flow.

In this testing, four sets of operating conditions were established, namely a low blanket with low flow, high blanket with low flow, low blanket with high flow and high blanket with high flow.

In the operating conditions the low blanket and high blanket were 4.3 feet and 6.3 feet; respectively. The low flow and high flow were defined as SOR=900 gpd/ft$^2$ and SOR=1200 gpd/ft$^2$, respectively.

Each of the three baffle configurations was scaled for the 100-foot clarifier, as follows:

Case 01 (prior art): D=36.0 inches; L=45 inches; α=45°; P=32 inches (based on 18+0.2(100−30)); and t=3.0 inches Case 04: D=36.0 inches; L=57 inches; α=45°; P=37.75 inches and t=3.0 inches Case 07; D=36.0 inches; L=37 inches; α=60°; P=32 inches and t=3.0 inches For the case where the sludge blanket was low, and the flow was less than SOR=700, vertical currents near the outer wall of the clarifier did not form strongly. In fact, under these circumstances, these currents tend to rise up and that fall back on themselves. In this case, maximum effluent solids concentrations are calculated during model spin-up (around t=40 minutes) and then they moderate somewhat. While it does appear that maximum effluent solids concentrations are reduced with baffles (cases 1, 4 and 7) in place, the influence of the baffles is minimized. The best perforate is achieved for the Case 07 variation. The Case 7 has a basic horizontal projection, but the inclination angle from the wall is increased to 60 degrees. As a result, the end of this baffle design is positioned further above the sludge blanket than the standard baffle.

Figure 7:
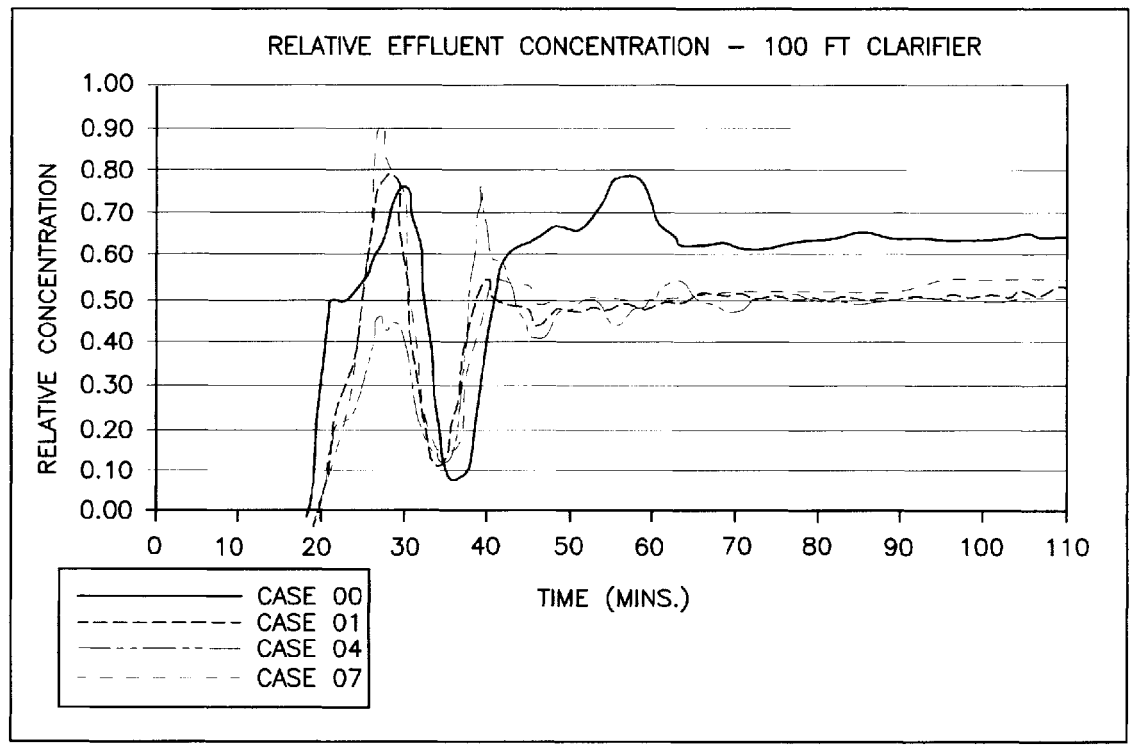
FIG. 7 shows a third set of exemplary test results.

FIG. 7 shows the results of the simulation with a high blanket and low flow. Here, the difference between the low blanket and high blanket is only 2 feet, and the top of the blanket is 2 feet closer to the baffle. As shown in FIG. 7, in this case it appears that the vertical currents were stronger near the clarifier wall and the Case 0 effluent solids concentrations remained high even after model spin-up. In this same scenario, the Case 4 baffle configuration performed best. As before, however, in these low flow scenarios, the effectiveness of the baffle was proportionally small.

In all of the low blanket simulations, particularly those with low flow, only weak density currents appeared at the outer wall of the clarifier, and those lacked sufficient energy to climb the wall and reach the effluent trough. Later simulations showed that SOR in the range of 600 to 800 gpd/sqft were required to produce short-circuiting currents. Blanket depth is also a contributing factor. This is consistent with field results that suggest that at or below design flow, density currents are not significant and the effect of the baffle is lessened.

Finally, a set of calculations was carried out for a high flow (1200 SOR) condition with a high (6.3 foot) blanket. The results are shown in Table 3 below. In this scenario, the Case 01 and 07 baffles performed best. From the flow patterns it appeared that the Case 4 baffle was positioned too close to the blanket and created a disturbance there that affected its performance.

TABLE 3

Percent Solids Reduction, High Flow-High Blanket

| Case No. | Relative Effluent Solids Concentration vs. Case 00 (%) |
|---|---|
| 01 | 33% |
| 04 | 63% |
| 07 | 30% |

Figure 8:
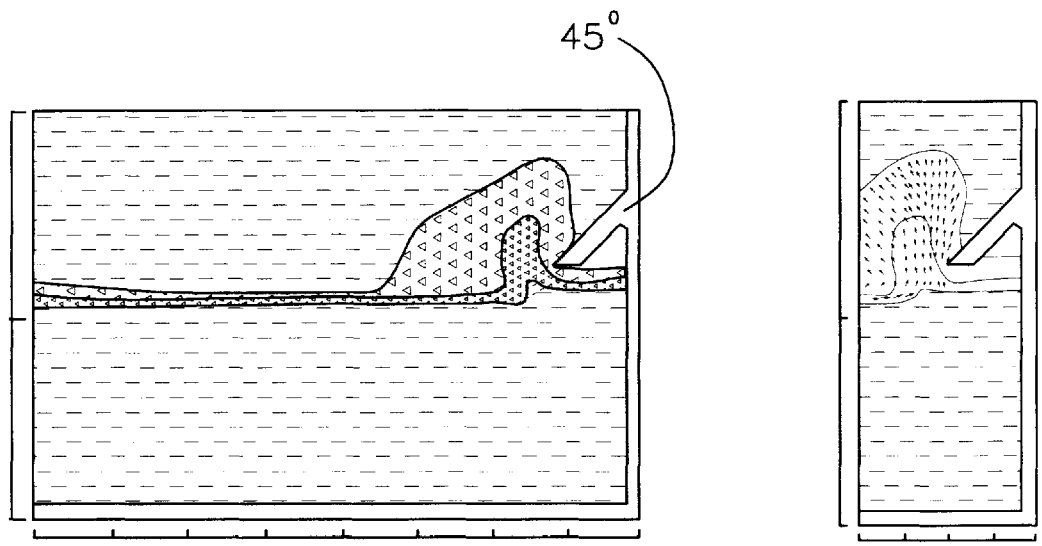
FIGS. 8 and 8b show a fourth set of exemplary test results.
Figure 8B:
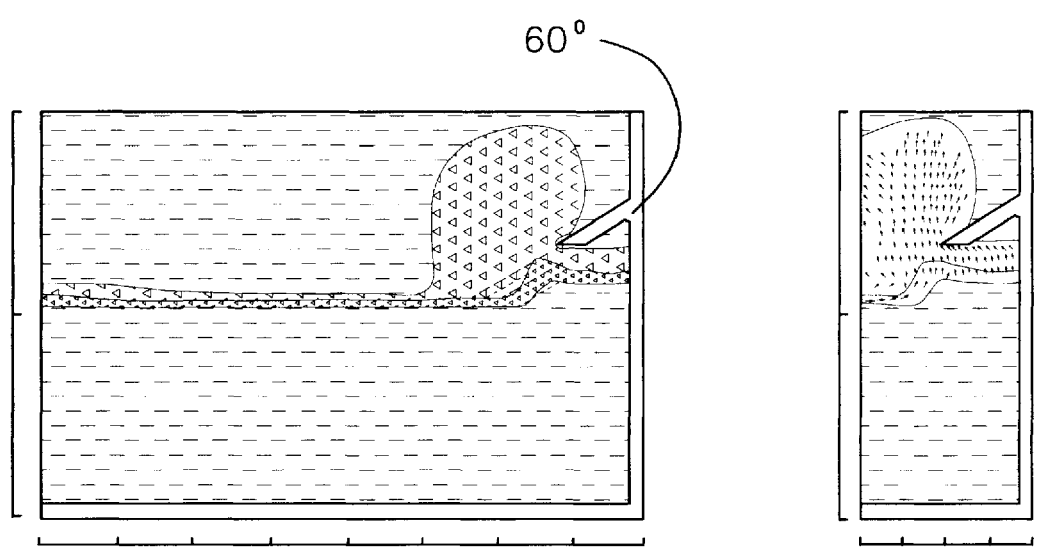

The difference between Case 01, 04 and 07 baffles is the fact that the inclination angle of the Case 07 baffle (60° versus 45°) has been made more shallow, in effect increasing the relative distance between the baffle and the top of the sludge blanket. The calculated flow patterns in FIGS. 8A and 8B show the development of a short-circuiting pattern in this area.

Based on the above test results, a third set of testing was done using the 100 foot (by 14 foot tall) clarifier arrangement using three samples:

Case 8 (Prior art with 8" projection extension) 45° inclination angle and 32 inch horizontal projection.

Case 9 extended prior art baffle with 45° inclination angle with 39 inch horizontal projection (based on 18"+(0.3×(100−30))

Case 10 baffle 10 of the present arrangement having a combination of a 60° inclination angle from wall T and an extended 39 inch horizontal projection.

Figure 9:
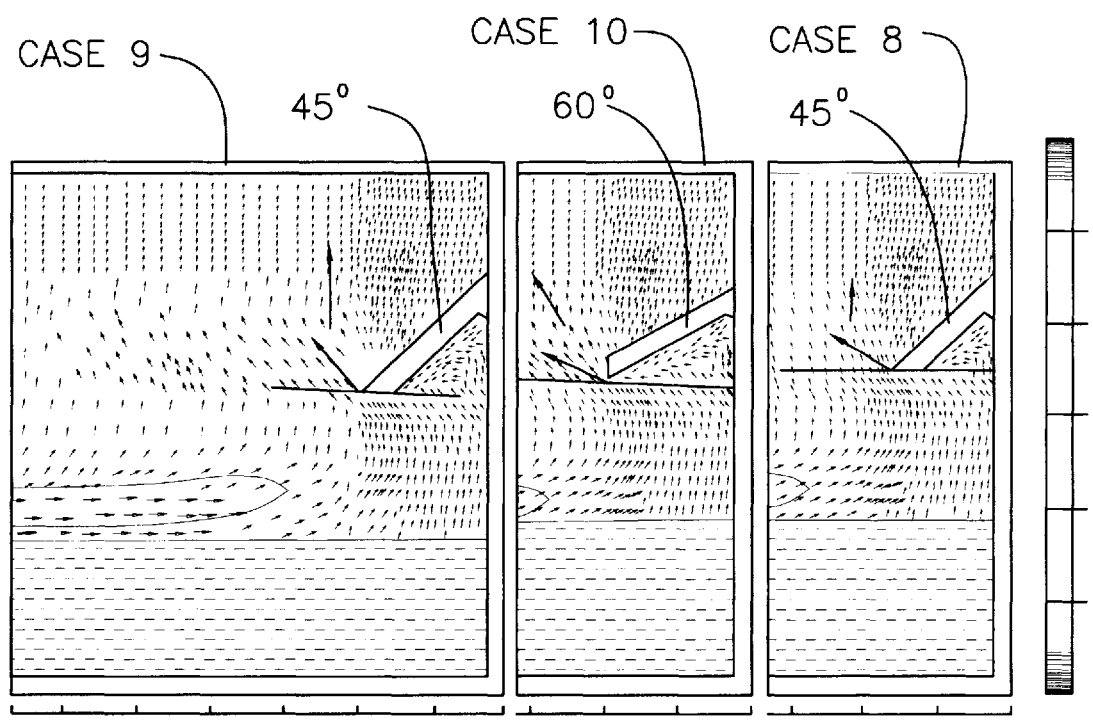
FIG. 9 shows a fifth set of exemplary test results, in accordance with one embodiment.
Figure 10:
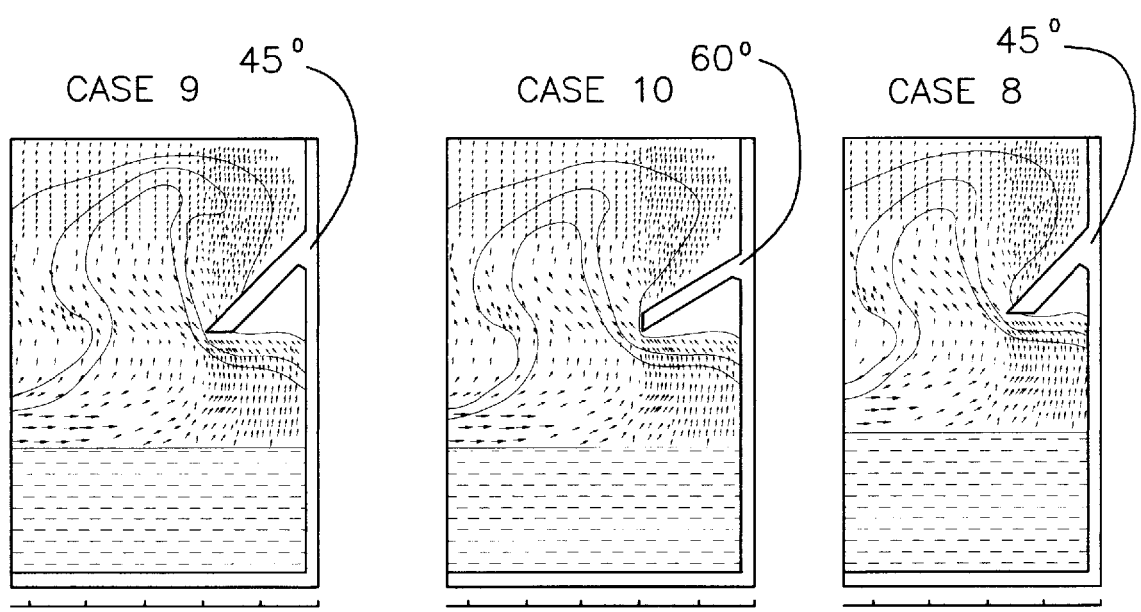
FIG. 10 shows a sixth set of exemplary test results, in accordance with one embodiment.

The flow patterns that resulted from these calculations are shown in FIGS. 9 and 10. The calculated relative solids concentrations show that the case 8 baffle, although effective was surpassed by the extended baffle (case 9—(20% more effective)) and even more so by the case 10, where baffle 10 exhibited, such as that shown in FIGS. 1-3, 30% more effective that the prior art baffle designs.

As such, the results in FIGS. 9 and 10 confirm that increasing the length of the horizontal projection of baffle surfaces 12 improves their ability to deflect wider density currents. The width of the current varies with clarifier dimensions, solids settling characteristics, flow and other parameters. Moreover, simultaneously increasing the inclination angle to substantially 60 degrees raises the bottom of the baffle, by end flange 20 further from the blanket which limits the sludge blanket's interference with the operation of baffle surface 12.

For example, this arrangement also opens a wider path for the solids under baffle 10 to be deflected from wall T. The flow patterns in FIG. 9 indicate that the velocity vectors emerging from beneath baffle 10 are aligned horizontally, toward the center of the clarifier C, which keeps higher solids concentrations further from the effluent weir currents. In contrast, the motion vectors at the top of both of the other baffles (Case 8 and 9) appear more vertically aligned. Accordingly, one feature that is determinative of the effectiveness of baffle 10, is the velocity vector generated by the 60 degree angle as shown in case 10 of FIG. 9. In an alternative arrangement, the 60 degree angle can be lowered to 55 degrees or increased to 70 degrees, so long as the velocity vector of solids can be aligned substantially horizontal to the clarifier tank. As shown in FIG. 9 case 10 as compared to case 9 and case 8, the velocity vector of case 10 is closer to horizontal that either of the other cases.

Regarding the positioning of baffle 10 relative to the sludge blanket, the first test (70-foot clarifier diameter) implied that there is a range of suitable values. In that test, the clarifier C is 10 feet deep and the top of the blanket was at 3 feet. The Cases 1, 4 and 7 baffles, all of which performed relatively well, were mounted 3 feet below the weir, but the bottom position of the 3 baffles were 19 inches, 11 inches and 33 inches, respectively, above the blanket. Of the other configurations, the Case 2 baffle was 3 inches above the blanket and apparently too close; the Case 6 baffle was into the blanket; the Case 3 baffle, at 43 inches, appears to be too far from the blanket.

It is noted that the Case 5 baffle was 28 inches above the blanket, (within the distance range defined by Cases 1, 4 and 7), but it did not perform well. However, it is noted that the Case 5 baffle had a shorter horizontal projection than the other baffles, and particularly shorter that the present baffle 10. The Case 4 baffle, on the other hand, was the closer to the blanket of the three best performing test cases, at 11 inches. Case 4 had the longest horizontal projection of all the test baffles. The case 7 baffle, at 33 inches, was almost twice as far from the blanket as the case 1 baffle (19 inches), and the two baffles had the same horizontal projection, but the case 7 baffle had a 60 degree inclination angle.

Accordingly, the test results show that the position of baffle 10 within, clarifier C relative to the top of the sludge blanket is not simply a matter of distance, but a combination of distance from the blanket as well as inclination angle and horizontal projection. With the baffle 10 having the dimensions as set forth above in Case 10 (60 degrees with 39 inch projection) the best performance relative to the height of the sludge blanket (to the bottom of the baffle 10 at end flange 20) is 2 feet + or −6 inches.

It is noted that the sludge blanket height is not always a definable position as it is constantly changing in height based on the flow and sediment conditions within the clarifier. Thus, the optimum position for baffle 10 is based on an estimate of typical blanket heights and variation that might occur in normal operations in each particular clarifier C. In one arrangement, in order to address this issue, baffle 10 may be positioned at a point midway between the average blanket height and the weir in order to estimate the 2 foot from blanket height.

In any event, in the present arrangement, baffle 10, in order to function effectively across the range of operating conditions of any clarifier C, is positioned at a low enough point that its proximity to the blanket allows it to perform effectively whenever density currents carrying solids are able to reach it, and not so low that there is a danger that the blanket could rise above it.

Figure 12:
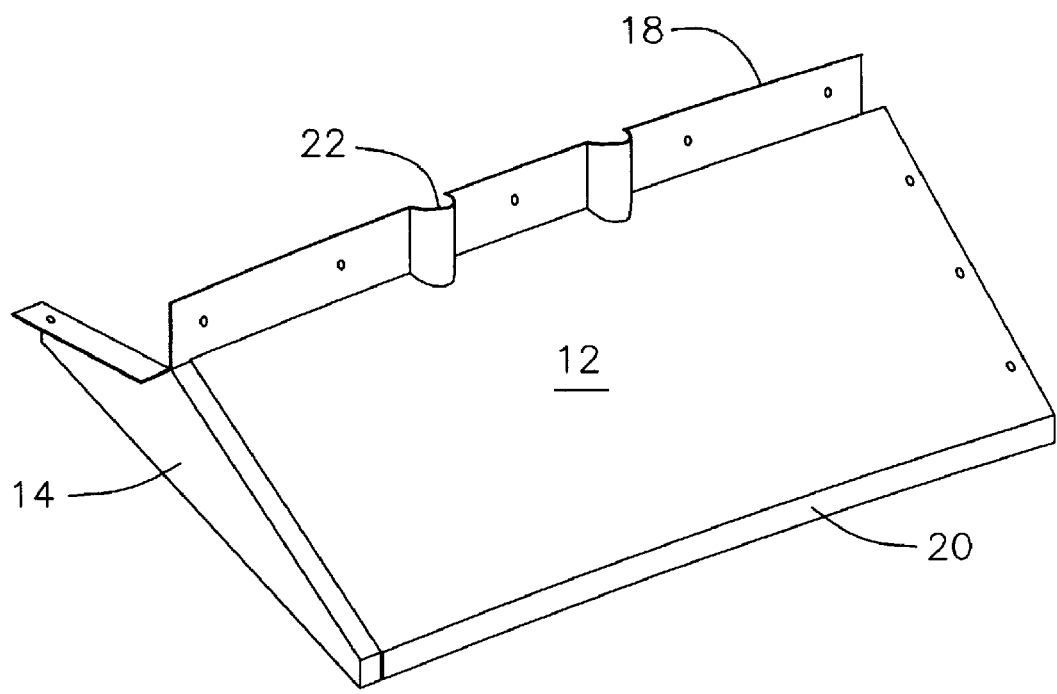
FIG. 12 shows an alternative baffle surface, in accordance with one embodiment.
Figure 13:
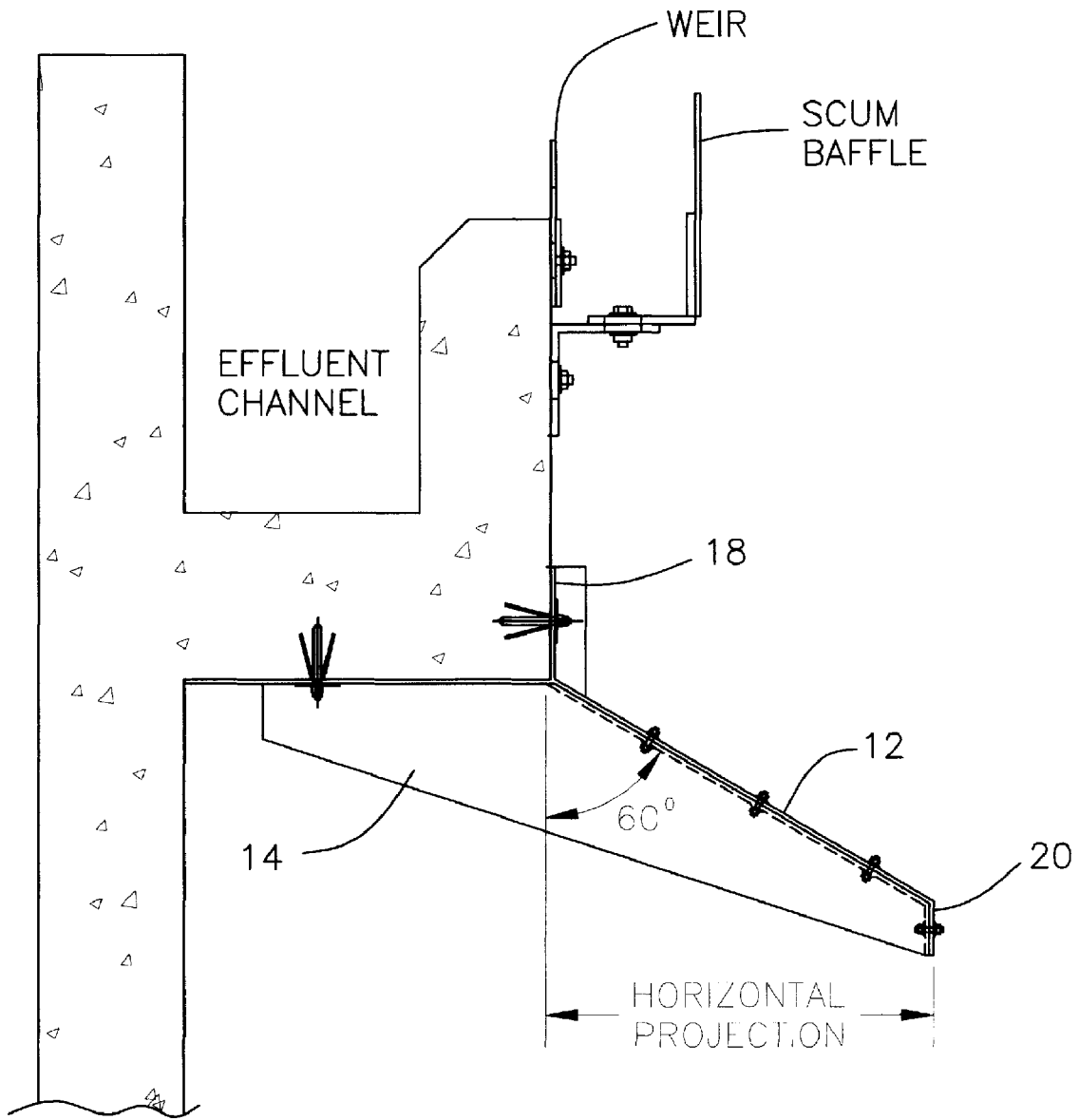
FIG. 13 shows an alternative baffle surface coupled to a tank, in accordance with one embodiment.

In an alternative arrangement, as shown in FIGS. 12 and 13, a baffle surface 12 is shown with a modified bracket element 14. This bracket element 14, extends backward to provide an additional mounting surface beyond the upper mounting flange 18. Such an arrangement, allows for baffle surface 12 to be mounted directly below the effluent channel under the weir.

In this arrangement, the substantially 60 degree angle is maintained. Also, the horizontal projection, as measured from the wall of the effluent channel (instead of the tank wall) allows for additional projection of the lower end of baffle surface 12 into the center of clarifier C. This positioning of baffle 10 directly below the effluent channel, ensures a sufficient distance from the average height of the sludge blanket and ensures that the lower end of baffle surfaces 12 do not fall below the periodically rising sludge blanket.

In one arrangement, for typical twelve-fourteen foot deep clarifiers C, baffle 10 is optimally positioned five feet below the weir (water level), which generally places it approximately midway between the typical blanket and the launder channel.

Figure 11:
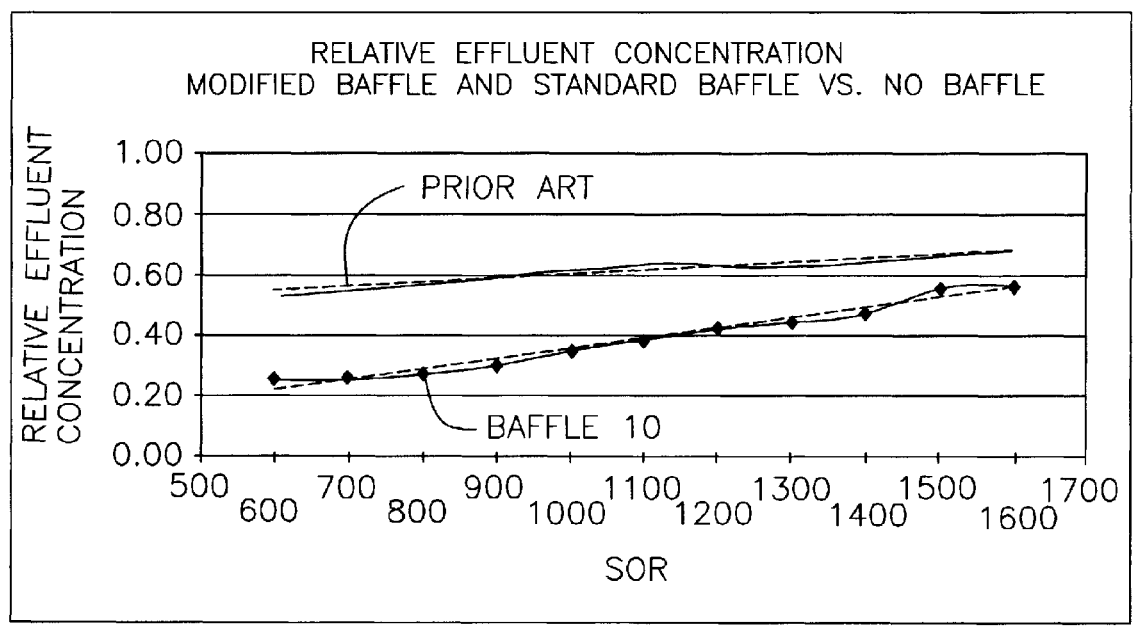
FIG. 11 shows a seventh set of exemplary test results, in accordance with one embodiment.

As shown in FIG. 11, further calculations of solids concentrations in the effluent are performed using the parameters of the third test comparing these two baffle configurations (Case 8 prior art versus Case 10 (baffle 10 of the present arrangement) over a broad range of increasing SOR values.

In order to further demonstrate the effectiveness of baffle 10 relative to the prior art baffle arrangements, tests were again simulated with even larger 130 diameter clarifiers C. In these cases, as with the above described samples in the third test, baffle 10 of the present arrangement, with a 60 degree angle and extended horizontal projection shows a 30% improvement in reduction in solids (in the effluent) relative to the model predictions based on prior art baffle designs. As can be expected, baffle 10 in the range of 55 to 70 degrees with a similar extended horizontal projection, would achieve similar results to the third test.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A baffle system in a clarifier tank having a tank bottom, a periphery and a substantially vertical peripheral wall bounding the interior of the tank, said tank having an effluent channel, said baffle system comprising:
a plurality of baffles mounted on the clarifier tank, each baffle comprising:
a baffle surface, said baffle surface having a lower end and an upper end, the upper end of said baffle surface being coupled to a wall of the clarifier tank, the lower end of said baffle surface being disposed, at a substantially 60° angle away from said wall of the clarifier tank such that said baffle surface slopes downwardly and away from said wall
where the horizontal projection of said baffle into the center of the tank is determined using the following equation:

$$HP = 18'' + a(D-30)$$

D=diameter of the tank in feet;
a=coefficient multiplier
with the coefficient "a" set to 0.3 inches per foot or greater.

2. The baffle system of claim 1, wherein said baffle surfaces, further comprise mounting flanges for securing to said wall of said clarifier tank.

3. The baffle system of claim 2, wherein each of said baffle surfaces further comprise vent openings integrally molded within said mounting flange.

4. The baffle system of claim 1, wherein said horizontal projection is substantially 39 inches in a clarifier tank of 100 ft diameter.

5. The baffle system of claim 1, wherein said baffle surfaces each have a lower end flange.

6. The baffle system of claim 5, wherein said clarifier tank has a sludge blanket that is a collection of solids at the bottom of said tank, wherein said lower end flanges of said baffle surfaces are positioned substantially 2 feet from the top of said sludge blanket.

7. The baffle system of claim 5, wherein said clarifier tank has a sludge blanket that is a collection of solids at the bottom of said tank, wherein said lower end flanges of said baffle surfaces are positioned at a point midway between the average blanket height of said sludge blanket and the weir.

8. The baffle system of claim 1, wherein said upper end of said baffle surface is coupled to the peripheral wall of said clarifier tank.

9. The baffle system of claim 1, wherein said upper end of said surface is coupled to the wall of the effluent channel of said clarifier tank.

10. A baffle system in a clarifier tank having a tank bottom, a periphery and a substantially vertical peripheral wall bounding the interior of the tank, said tank having an effluent channel, said baffle system comprising:
   a plurality of baffles mounted on the peripheral wall of the clarifier tank, each baffle comprising:
   a baffle surface, said baffle surface having a lower end and an upper end, the upper end of said baffle surface being coupled to said peripheral wall of the clarifier tank, the lower end of said baffle surface being disposed, at a substantially 60° angle away from the peripheral wall of the clarifier tank such that said baffle surface slopes downwardly and away from said peripheral wall and defines a horizontal projection,
   wherein the horizontal projection of said baffle into the center of the tank is determined using the following equation:

$HP = 18'' + a(D-30)$

D=diameter of the tank in feet;
   a=coefficient multiplier
   with the coefficient "a" is set to 0.3 inches per foot or greater.

11. The baffle system of claim 10, wherein said baffle surfaces, further comprise mounting flanges for securing to the wall of said clarifier tank.

12. The baffle system of claim 11, wherein each of said baffle surfaces further comprises vent openings integrally molded within said mounting flange.

13. A baffle system in a clarifier tank having a tank bottom, a periphery and a substantially vertical peripheral wall bounding the interior of the tank, said tank having an effluent channel, said baffle system comprising:
   a plurality of baffles mounted on a wall of the clarifier tank, each baffle comprising:
   a baffle surface, said baffle surface having a lower end and an upper end, the upper end of said baffle surface being coupled to said wall of the clarifier tank, the lower end of said baffle surface being disposed, away from the wall of the clarifier tank such that said baffle surface slopes downwardly and away from the wall so that it generates a substantially horizontal velocity vector of solids emerging from under said baffle surface
   where the horizontal projection of said baffle into the center oldie tank is determined using the following equation:

$HP = 18 + a(D-30)$

D=diameter of the tank in feet;
   a=coefficient multiplier
   with the coefficient "a" set to 0.3 inches per foot.

14. The baffle system of claim 13, wherein said baffle surfaces, further comprise mounting flanges for securing to the wall of said clarifier tank.

15. The baffle system of claim 14, wherein each of said baffle surfaces further comprise vent openings integrally molded within said mounting flange.

16. The baffle system of claim 13, wherein said horizontal projection is substantially 39 inches and said clarifier tank is of 100 ft diameter.

17. The baffle system of claim 13, wherein said baffle surfaces each have a lower end flange.

18. The baffle system of claim 17, wherein said clarifier tank has a sludge blanket that is a collection of solids at the bottom of said tank, wherein said lower end flanges of said baffle surfaces are positioned substantially 2 feet from the top of said sludge blanket.

19. The baffle system of claim 13, wherein said upper end of said baffle surface is coupled to the peripheral wall of said clarifier tank.

20. The baffle system of claim 13, wherein said upper end of said surface is coupled to the wall of the effluent channel of said clarifier tank.

* * * * *